Nov. 16, 1943.  E. F. M. COX  2,334,609
CORE SOLDER
Filed Nov. 20, 1940

Inventor:
E. F. MARTIN COX
By C. F. Kaegebehr Atty.

Patented Nov. 16, 1943

2,334,609

UNITED STATES PATENT OFFICE 2,334,609

CORE SOLDER

Ernesto Francisco Martin Cox, Ramos Mejia, F. C. O., Argentina, assignor to National Lead Company, New York, N. Y., a corporation of New Jersey Application November 20, 1940, Serial No. 366,390

3 Claims. (Cl. 113—110)

The present invention relates to solders of the type having one or more longitudinal cores or veins, containing fluxing material within the interior of the solder.

As early as 1872 William M. Neil of Bridgeport, Connecticut, proposed a soldering rod consisting of a tube of solder metal filled with a flux material. Thereafter, and up to the present time, various types of flux-core solders have been proposed. All these proposals were based upon the underlying idea of a solder consisting of a solder metal portion distinct from, although in contact with, a flux portion. All such flux-core solders possessed certain disadvantages: First, they always contained voids, or empty spaces within the solder tube which contained no flux; second, when melted, the molten flux tended to separate from the molten solder. Furthermore, such flux-core solders of the prior art, while possibly constituting a convenient means for bringing both solder metal and flux together, ready for use, do not insure that the solder metal when molten is evenly and uniformly in contact with molten flux. The present invention represents a fundamental departure from the conception of flux-core solders of the prior art and provides a solder which is free from the disadvantages thereof.

An object of the present invention is to provide a new type of core solder which is free from the disadvantages of prior art products. Another object of the invention is a solder having one or more cores, or veins longitudinally disposed within the interior thereof, containing a fluxing material in intimate and uniform admixture with finely comminuted solder metal. These and other objects of the invention will be more fully understood from this description.

In its broadest aspects, the invention contemplates a solder consisting of an outer shell of solder metal encasing fluxing material intimately and uniformly mixed with solder metal, the said mixture being longitudinally disposed within the shell of the solder metal. Such solder may be produced according to the invention, for instance, by extrusion, brought about by pressure applied to a plugged, hollow capsule of solder metal, containing an intimate and uniform mixture of fluxing material and finely comminuted solder metal.

Turning now to the drawing.

The novel solder of the present invention, as will be appreciated may contain one or more veins of solder-flux mixture longitudinally disposed within the interior of the solder. The invention is not limited with respect to the shape of the solder produced. Thus, according to the invention, the solder may be in the form of wire, rods, or strips, having any desired cross-section, for instance, circular, square, rectangular, triangular, etc. The shape of the solder may be controlled in any convenient manner, depending upon the means employed for producing the novel solder; for instance, the shape of the extrusion die, if the solder is prepared by extrusion methods, which are to be preferred.

The invention contemplates the use of any suitable fluxing material, such as rosin (colophony), or the well-known fluxing salts, such as aluminum chloride, zinc chloride, stannic chloride, or liquids, such as glycerine and acids of various kinds, as well as mixtures thereof.

The proportion of fluxing material to comminuted solder metal, which makes up the mixture constituting the vein or veins within the novel solder, is not important, but may be varied according to the demands of the trade. In some instances it may be desired to have a relatively small amount of flux in proportion to the amount of comminuted solder metal and in others, a higher proportion.

The composition of the solder metal encasing the flux solder metal mixture does not necessarily have to be the same as the comminuted solder metal employed in the preparation of the mixture. For instance, the solder metal for the outer casing may be selected for its properties of hardness in order to protect the interior mixture, whereas the comminuted metal, constituting part of the mixture, may be selected for its melting and bonding properties. However, generally speaking, the composition of the external solder metal casing will be the same as the comminuted solder metal used in preparing the mixture. When properly prepared, the core or cores of flux-solder metal mixture within the interior of the novel solder of the present invention will be completely homogeneous and free from voids or air spaces. Upon fracturing a solder prepared according to the present invention and examining the interior, it should be impossible readily to distinguish particles of comminuted solder metal from the particles of flux. As has been stated, the solder may be prepared by any convenient means known to the art. However, the invention includes a simple, efficient and economical means of manufacturing improved solders.

Figure 1:
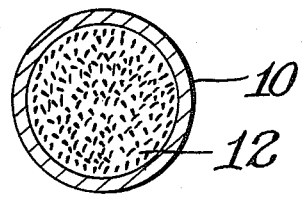
Fig. 1 is a cross-sectional view of a solder of the present invention, having a single longitudinal core, or vein, of admixed solder metal and flux.
Figure 2:
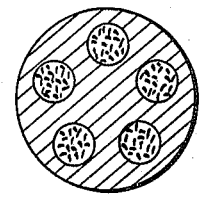
Fig. 2 is a cross-sectional view of a solder of the present invention having a plurality of longitudinal cores or veins of admixed solder metal and flux.
Figure 3:
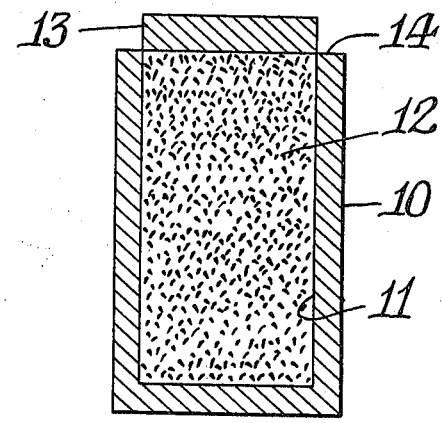
Fig. 3 is a cross-sectional representation of a capsule filled with an intimate, uniform mixture of flux and finely comminuted solder metal.

According to the novel method of the invention, a capsule, or slug, reference number 10, Fig. 3, is first prepared from solder metal by stamping, casting or any other convenient way. Finely comminuted solder metal prepared in any convenient manner is intimately mixed with a flux material, for instance, powdered rosin, powdered ammonium chloride, zinc chloride or the like, or mixtures of fluxing material. In the mixing of the finely comminuted metal with the flux, care should be exercised in order to obtain an even and uniform admixture of the materials. The interior, 11, is filled with this mixture, 12. It is desirable that the mixture be rammed into the slug in order to eliminate as much as possible air spaces between the particles of flux and comminuted metal. When the capsule has been filled with the solder-metal mixture, the capsule is closed by means of a plug, 13, also of solder-metal, which is placed upon the mixture, leaving the lip, 14, free.

Figure 4:
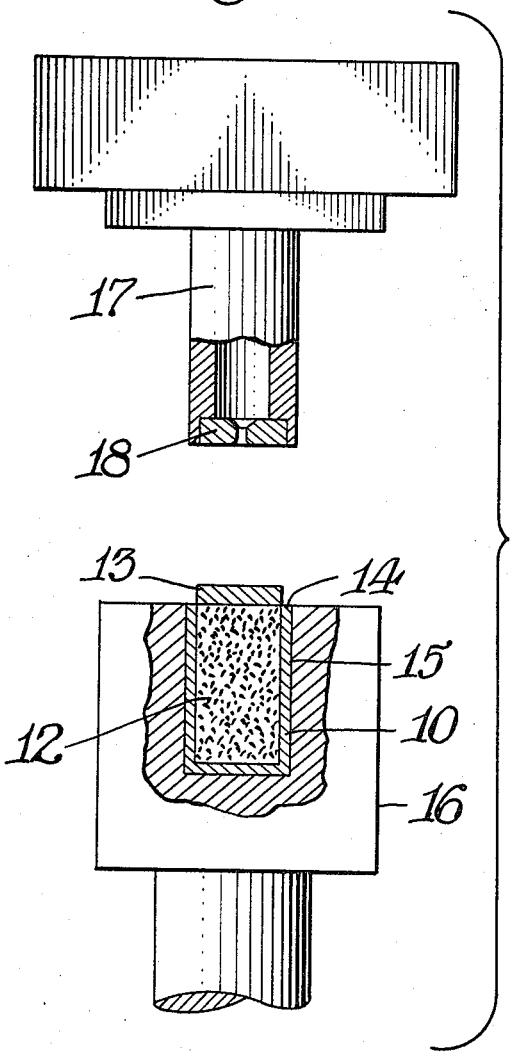
Fig. 4 is a diagrammatical representation of a hydraulic press with the solder capsule in position, ready for extrusion.

The capsule with its plug is placed in a cavity, 15, Fig. 4 of a cylinder, 16, of a hydraulic press. The press of the type used for extruding metal piping may be used to good advantage. The capsule is compressed by action of the ram, 17, carrying a die, 18. The initial pressure forces the plug, 13, down into the mixture, amalgamating the flux solder metal mixture and squeezing out any air which may be entrained therein. Under further pressure, the mass formed by the capsule, its contents and the plug, is forced through the hole in the die, 18, and extruded in the form of the die hole. The outer shell or casing of the extruded solder will be formed of the metal of the plug and the capsule, and will tightly encase the intimate mixture of solder metal and flux, which is solidly compacted together by the initial axial compression and by the radial tangential pressure to which it is subjected during the extrusion.

In some cases where a fusible flux is employed, it may be advantageous to heat the mixture of flux and comminuted metal in order to melt the flux, thereby further facilitating the elimination of entrapped air and insuring that every particle of the comminuted metal is in intimate contact with flux. In this condition, the solder-flux mixture may be charged directly into the capsule or it may be cooled and thereafter, if necessary, pulverized and charged into the capsule.

If it be desired to produce according to the present invention a solder having a plurality of flux-solder metal cores, or veins, the capsule of solder metal instead of having a single hollow cavity may be constructed to include a plurality of separate cavities. These cavities are then charged with the flux-solder metal mixture and the individual cavities closed by means of individual plugs of solder metal. The individual plugs, for instance, may be in the form of truncated cones over which may be fitted an additional single closing plug, also of solder metal, covering the entire top of the capsule. The multicavity capsules may then be placed in the cylinder of a hydraulic press and extruded through a die, in the manner above described.

From the foregoing, it will be appreciated that the present invention constitutes a radically new departure from the flux-core solders of the prior art. The novel solders of the present invention are free from the disadvantages of the prior art and may easily be prepared according to the novel method herein-above described.

The foregoing description of my invention has been given merely for illustrative and not limitative purposes and no intention should be deduced therefrom of excluding from the scope of the invention any modification or variations lying within the skill of the art.

I claim:

1. A new extruded solder composition comprising a seamless casing of solder metal enclosing a plurality of longitudinally disposed compact cores of comminuted solder metal intimately and uniformly admixed with fluxing material.

2. An extruded solder composition comprising an outer extruded seamless casing of solder metal enclosing and being completely filled with a longitudinally disposed extruded homogeneous core of a compact uniform and intimate mixture of comminuted solder metal and fluxing material, said composition being free from voids and air spaces within said core and between said core and said extruded seamless casing.

3. An extruded solder composition comprising an outer extruded seamless casing of solder metal having a plurality of longitudinally disposed veins within said casing each of which veins enclosing and being completely filled with a longitudinally disposed extruded homogeneous core of a compact uniform and intimate mixture of comminuted solder metal and fluxing material, said composition being free from voids and air spaces within said cores and between said cores and said veins of the extruded seamless casing.

ERNESTO FRANCISCO MARTIN COX.